United States Patent
Brockley

(10) Patent No.: US 10,457,287 B2
(45) Date of Patent: Oct. 29, 2019

(54) VEHICLE CONTROL SYSTEM AND METHOD

(71) Applicant: JAGUAR LAND ROVER LIMITED, Whitley, Coventry, Warwickshire (GB)

(72) Inventor: Nick Brockley, Lichfield (GB)

(73) Assignee: Jaguar Land Rover Limited, Whitley, Coventry (GB)

( * ) Notice: Subject to any disclaimer, the term of this patent is extended or adjusted under 35 U.S.C. 154(b) by 66 days.

(21) Appl. No.: 15/547,009

(22) PCT Filed: Jan. 15, 2016

(86) PCT No.: PCT/EP2016/050803
§ 371 (c)(1),
(2) Date: Jul. 27, 2017

(87) PCT Pub. No.: WO2016/120100
PCT Pub. Date: Aug. 4, 2016

(65) Prior Publication Data
US 2018/0001897 A1 Jan. 4, 2018

(30) Foreign Application Priority Data
Jan. 27, 2015 (GB) .................................. 1501316.2

(51) Int. Cl.
*B60W 30/18* (2012.01)
*B60K 28/16* (2006.01)
(Continued)

(52) U.S. Cl.
CPC ....... *B60W 30/18172* (2013.01); *B60K 28/16* (2013.01); *B60W 10/04* (2013.01);
(Continued)

(58) Field of Classification Search
CPC .......... B60W 30/18172; B60W 30/02; B60W 30/143; B60W 10/04; B60W 10/06;
(Continued)

(56) References Cited

U.S. PATENT DOCUMENTS 4,961,146 A 10/1990 Kajiwara
4,987,966 A 1/1991 Fujita
(Continued)

FOREIGN PATENT DOCUMENTS

CN 105939882 A 9/2016
DE 19603427 A1 8/1996
(Continued)

OTHER PUBLICATIONS

Combined Search and Examination Report for application No. GB1501316.2, dated Jun. 29, 2015, 5 pages.
(Continued)

*Primary Examiner* — Aaron L Troost
(74) *Attorney, Agent, or Firm* — Reising Ethington P.C.

(57) ABSTRACT

A vehicle control system includes a speed control system which is configured automatically to attempt to cause a vehicle to operate in accordance with a target speed value by causing a first vehicle speed value determined according to a first predetermined method to become or be maintained substantially equal to the predetermined target speed value at least in part by causing application of positive drive torque to one or more wheels by means of a powertrain. The speed control system is configured to impose a constraint on the amount of driving torque that may be demanded of the powertrain in dependence on the target speed value and a second vehicle speed value determined according to a second predetermined method. The second predetermined method is based on the mean speed of the driven wheels of the vehicle.

16 Claims, 9 Drawing Sheets

(51) Int. Cl.

| | |
|---|---|
| *B60W 30/02* | (2012.01) |
| *B60W 30/14* | (2006.01) |
| *B60W 10/06* | (2006.01) |
| *B60W 10/119* | (2012.01) |
| *B60W 10/18* | (2012.01) |
| *B60W 40/068* | (2012.01) |
| *B60W 10/04* | (2006.01) |

(52) U.S. Cl.
CPC .......... *B60W 10/06* (2013.01); *B60W 10/119* (2013.01); *B60W 10/18* (2013.01); *B60W 30/02* (2013.01); *B60W 30/143* (2013.01); *B60W 40/068* (2013.01); *B60W 2520/10* (2013.01); *B60W 2520/26* (2013.01); *B60W 2520/28* (2013.01); *B60W 2520/30* (2013.01); *B60W 2710/18* (2013.01); *B60W 2720/10* (2013.01)

(58) Field of Classification Search
CPC .. B60W 10/119; B60W 10/18; B60W 40/068; B60W 2520/10; B60W 2520/26; B60W 2520/28; B60W 2520/30; B60W 2710/18; B60W 2720/10; B60K 6/52; B60K 28/16
See application file for complete search history.

(56) References Cited

U.S. PATENT DOCUMENTS

| | | | |
|---|---|---|---|
| 5,737,714 | A | 4/1998 | Matsuno et al. |
| 7,318,629 | B1 | 1/2008 | Sun et al. |
| 7,349,776 | B2 | 3/2008 | Spillane et al. |
| 2017/0001645 | A1 | 1/2017 | Fairgrieve et al. |

FOREIGN PATENT DOCUMENTS

| | | | | |
|---|---|---|---|---|
| GB | 2492655 | A | | 1/2013 |
| GB | 2492748 | A | | 1/2013 |
| GB | 2499252 | A | | 8/2013 |
| GB | 2505668 | A | * | 3/2014 ............. B60K 28/16 |
| GB | 2505668 | A | | 3/2014 |
| GB | 2507622 | A | | 5/2014 |
| WO | WO2014027098 | A1 | | 2/2014 |
| WO | WO2014027111 | A1 | | 2/2014 |
| WO | WO2015110309 | A1 | | 7/2015 |

OTHER PUBLICATIONS

International Search Report for International application No. PCT/EP2016/050803, dated Jun. 6, 2016, 8 pages.
Written Opinion for International application No. PCT/EP2016/050803, dated Jun. 6, 2016, 8 pages.
Chinese Office Action corresponding to CN application No. 201680007135.8, dated Nov. 19, 2018, 12 pages.

* cited by examiner

VEHICLE CONTROL SYSTEM AND METHOD

FIELD OF THE INVENTION

The invention relates to a system for controlling a vehicle. In particular, but not exclusively, the invention relates to a system for controlling the speed of a land-based vehicle which is capable of driving in a variety of different and extreme terrains and conditions.

The content of co-pending UK patent applications GB2492748, GB2492655 GB2499252 and GB2507622, international patent application WO2014/027111 and U.S. Pat. No. 7,349,776 are hereby incorporated by reference.

BACKGROUND

In known vehicle speed control systems, typically referred to as cruise control systems, the vehicle speed is maintained on-road once set by the user without further intervention by the user so as to improve the driving experience for the user by reducing workload.

With typical cruise control systems, the user selects a speed at which the vehicle is to be maintained, referred to as a set-speed, and the vehicle is maintained at a target speed that is set equal to the set-speed for as long as the user does not apply a brake or, in the case of a vehicle having a manual transmission, depress a clutch pedal. The cruise control system takes its speed signal from a driveshaft speed sensor or wheel speed sensors. When the brake or the clutch is depressed, the cruise control system is disabled so that the user can override the cruise control system to change the vehicle speed without resistance from the system. If the user depresses the accelerator pedal by a sufficient amount the vehicle speed will increase, but once the user removes his foot from the accelerator pedal the vehicle reverts to the pre-set cruise speed (set-speed) by coasting.

Such systems are usually operable only above a certain speed, typically around 15-20 kph, and are ideal in circumstances in which the vehicle is travelling in steady traffic conditions, and particularly on highways or motorways. In congested traffic conditions, however, where vehicle speed tends to vary widely, cruise control systems are ineffective, and especially where the systems are inoperable because of a minimum speed requirement. A minimum speed requirement is often imposed on cruise control systems so as to reduce the likelihood of low speed collision, for example when parking. Such systems are therefore ineffective in certain driving conditions (e.g. low speed) and are set to be automatically disabled in circumstances in which a user may not consider it to be desirable to do so.

More sophisticated cruise control systems are integrated into the engine management system and may include an adaptive functionality which takes into account the distance to the vehicle in front using a radar-based system. For example, the vehicle may be provided with a forward-looking radar detection system so that the speed and distance of the vehicle in front is detected and a safe following speed and distance is maintained automatically without the need for user input. If the lead vehicle slows down, or another object is detected by the radar detection system, the system sends a signal to the engine or the braking system to slow the vehicle down accordingly, to maintain a safe following distance.

Known cruise control systems also cancel in the event that a wheel slip event is detected requiring intervention by a traction control system (TC system or TCS) or stability control system (SCS). Accordingly, they are not well suited to maintaining vehicle progress when driving in off road conditions where such events may be relatively common. Known TC systems are arranged to intervene and cause application of brake force to reduce wheel speed if the speed of any driven wheel (being a wheel driven by the powertrain, i.e. a driving wheel) exceeds a measured value of vehicle speed, referred to as a vehicle reference speed, by more than a prescribed threshold value (such as 5 kph). The vehicle reference speed may also be used by one or more other vehicle systems that require knowledge of instant vehicle speed.

The present applicant has developed a speed control system suitable for use in off-road driving conditions. The speed control system is configured to allow driving at relatively low speeds, such as speeds in the range from 2 to 30 kph at least, and is configured not to terminate speed control if a wheel slip event is detected requiring intervention by a TC system.

Known speed control systems typically employ a closed loop feedback control arrangement to maintain vehicle reference speed substantially equal to the speed control system target speed. In known cruise control systems, for example, the feedback control arrangement generates a powertrain torque demand signal to cause the value of vehicle reference speed to remain substantially equal to a cruise control target speed.

It is also known to provide a control system for a motor vehicle for controlling one or more vehicle subsystems. U.S. Pat. No. 7,349,776 discloses a vehicle control system comprising a plurality of subsystem controllers including an engine management system, a transmission controller, a steering controller, a brakes controller and a suspension controller. The subsystem controllers are each operable in a plurality of subsystem function or configuration modes. The subsystem controllers are connected to a vehicle mode controller which controls the subsystem controllers to assume a required function mode so as to provide a number of driving modes for the vehicle. Each of the driving modes corresponds to a particular driving condition or set of driving conditions, and in each mode each of the subsystems is set to the function mode most appropriate to those conditions. Such conditions are linked to types of terrain over which the vehicle may be driven such as grass/gravel/snow, mud and ruts, rock crawl, sand and a highway mode known as 'special programs off' (SPO). The vehicle mode controller may be referred to as a Terrain Response (TR)® System or controller. The driving modes may also be referred to as terrain modes, terrain response modes, or control modes.

SUMMARY OF THE INVENTION

Embodiments of the invention may be understood with reference to the appended claims.

Aspects and embodiments of the invention provide a system, a vehicle and a method.

The present disclosure relates to a vehicle control system and control method and particularly, but not exclusively, to a control system and control method for controlling a vehicle speed. Aspects of the invention relate to a control system, a vehicle, a control method, a controller, a computer program carrier medium, a computer program product, a computer readable medium and a processor.

In one aspect of the invention for which protection is sought there is provided a vehicle control system comprising a speed control system, the speed control system being configured automatically to attempt to cause a vehicle to operate in accordance with a target speed value by causing a first vehicle speed value determined according to a first predetermined method to become or be maintained substantially equal to the predetermined target speed value at least in part by causing application of positive drive torque to one or more wheels by means of a powertrain, wherein the speed control system is configured to impose a constraint on the amount of driving torque that may be demanded of the powertrain in dependence on the target speed value and a second vehicle speed value determined according to a second predetermined method, said a second predetermined method being based on the mean speed of the driven wheels of the vehicle.

The first vehicle speed value may be a first vehicle reference speed value generated by a controller. The reference speed value may be employed by one or more vehicle systems requiring data in respect of vehicle speed over ground. The second vehicle speed value may be a second vehicle reference speed value. In some embodiments the first and second reference speed values may be determined by substantially the same method, that is the first and second methods may be substantially the same. Accordingly, when controlling vehicle speed, the speed control system may refer to a vehicle speed value signal that is substantially the same signal that the speed control system refers to in order to determine when to impose a constraint on the amount of driving torque that may be demanded of the powertrain. Alternatively, the first and second methods may be different and therefore the first and second speed values may be different as a consequence. Two respective signals may be provided, one indicative of the first reference speed value and the other indicative of the second reference speed value. In some embodiments, the first and/or second reference speed values may be generated by a brake controller. In some embodiments at least the first reference speed value may be generated by the brake controller, for example by an anti-lock braking system controller. Other arrangements may be useful in some alternative embodiments.

A vehicle control system comprising a speed control system as described above, wherein:

the speed control system comprises an electronic processor configured to receive one or more signals indicative of a vehicle speed, and an electronic memory device electrically coupled to the electronic processor and having instructions stored therein, the processor being configured to access the memory device and execute the instructions stored therein such that it is operable to automatically to attempt to cause a vehicle to operate in accordance with a target speed value by causing a first vehicle speed value determined according to a first predetermined method to become or be maintained substantially equal to the predetermined target speed value at least in part by causing application of positive drive torque to one or more wheels by means of a powertrain, wherein the control system, optionally the processor, is configured to impose a constraint on the amount of driving torque that may be demanded of the powertrain in dependence on the target speed value and a second vehicle speed value determined according to a second predetermined method, said a second predetermined method being based on the mean speed of the driven wheels of the vehicle.

The processor may be configured to impose the constraint on the amount of driving torque that may be demanded of the powertrain according to the instructions stored in the electronic memory device.

Optionally, the speed control system is configured to constrain the amount of driving torque that may be demanded of a powertrain when a predetermined condition is met in respect of the target speed value and second vehicle speed value.

Optionally, the predetermined condition includes the condition that the second vehicle speed value exceeds the target speed value by a predetermined excess speed value.

Optionally, the second vehicle speed value is set substantially equal to the mean speed of the driven wheels of the vehicle.

The system may comprise a slip control system configured automatically to cause a reduction in a net torque applied to a wheel when its speed exceeds a predetermined vehicle speed value by a predetermined slip control system intervention threshold value.

It is to be understood that the slip control system intervention threshold value may be a substantially constant value that is substantially independent of wheel speed. Alternatively the slip control system intervention threshold value may be dependent on vehicle speed, optionally a proportion of a speed value such as a proportion of the first vehicle speed value. In some alternative embodiments the slip control system intervention threshold value may be a proportion of the second vehicle speed value.

Optionally, the predetermined excess speed value is substantially equal to the slip control system intervention threshold value multiplied by the number of driven wheels of the vehicle.

Thus, in the case that the vehicle has four driven wheels, e.g. on a vehicle having four wheels that may be driven by a powertrain, the predetermined excess speed value may be set substantially equal to the slip control system intervention threshold value multiplied by a factor of 4.

Optionally, the slip control system is configured automatically to cause the reduction in net torque applied to a wheel when its speed exceeds a predetermined one of the first and second vehicle speed values by the predetermined slip control system intervention threshold value.

Thus in some embodiments the slip control system may cause a reduction in net torque in dependence on wheel speed exceeding the first vehicle speed value by the predetermined slip control system intervention threshold value. In some alternative embodiments the slip control system may cause a reduction in net torque in dependence on wheel speed exceeding the second vehicle speed value by the predetermined slip control system intervention threshold value.

It is to be understood that in some embodiments the slip control system may cause a reduction in net torque in dependence on wheel speed exceeding a speed value other than one of the first and second vehicle speed values by the predetermined slip control system intervention threshold value.

Optionally, the first vehicle speed value is set substantially equal to a speed of a slowest turning wheel of the vehicle.

Thus, the speed control system may be configured to control vehicle speed using the speed of the slowest turning wheel as the value of prevailing vehicle speed. in some embodiments the speed control system may therefore attempt to control the amount of driving torque demanded of the powertrain so as to cause the speed of the slowest turning wheel to become and/or remain substantially equal to the target speed.

In some alternative embodiments a measure of vehicle speed other than the speed of the slowest turning wheel may be employed as the first vehicle speed value, such as the speed of the second slowest turning wheel, or any other suitable measure.

Optionally, the speed control system is operable to cause a vehicle to operate in accordance with a target speed value by controlling an amount of brake torque applied by a braking system and in addition by controlling an amount of drive torque applied by a powertrain to one or more wheels of the vehicle.

Optionally, the slip control system is configured to cause the reduction in net torque applied to a wheel at least in part by application of brake torque to the wheel by means of a braking system and/or by causing a reduction in an amount of powertrain torque applied to the wheel.

Optionally, the first and second methods are different.

In some alternative embodiments the first vehicle speed value is determined by substantially the same method as the second vehicle speed value.

As discussed above, in some embodiments the first and second speed values may be determined by substantially the same method, that is the first and second methods may be substantially the same. Accordingly, when controlling vehicle speed, the speed control system may refer to a vehicle speed value signal that is substantially the same signal that the speed control system refers to in order to determine when to impose a constraint on the amount of driving torque that may be demanded of the powertrain. Alternatively, the first and second methods may be different and therefore the first and second speed values may be different as a consequence. Two respective signals may be provided, one indicative of the first speed value and the other indicative of the second speed value.

In a further aspect of the invention for which protection is sought there is provided a motor vehicle comprising a body, a plurality of wheels, a powertrain to drive said wheels, a braking system to brake said wheels, and a control system according to any preceding claim.

The vehicle may comprise four wheels and be operable in at least one of a four wheel drive configuration, in which four of the wheels are driving wheels driven by the powertrain, and a two wheel drive configuration, in which only two of the wheels are driving wheels driven by the powertrain.

In a still further aspect of the invention for which protection is sought there is provided a method of controlling a vehicle, comprising:
  automatically attempting, by means of a speed control system, to cause the vehicle to operate in accordance with a target speed value by causing a first vehicle speed value determined according to a first predetermined method to become or be maintained substantially equal to the predetermined target speed value at least in part by causing application of positive drive torque to one or more wheels by means of a powertrain, the method comprising imposing a constraint on the amount of driving torque that may be demanded of the powertrain in dependence on the target speed value and a second vehicle speed value determined according to a second predetermined method, said a second predetermined method being based on the mean speed of the driven wheels of the vehicle.

The method may comprise constraining automatically the amount of driving torque that may be demanded of a powertrain when a predetermined condition is met in respect of the target speed value and second vehicle speed value.

Optionally, the predetermined condition includes the condition that the second vehicle speed value exceeds the target speed value by a predetermined excess speed value.

Optionally, the method comprises setting the second vehicle speed value substantially equal to the mean speed of the driven wheels of the vehicle.

The method may comprise causing automatically a reduction in a net torque applied to a wheel when its speed exceeds a predetermined vehicle speed value by a predetermined slip control system intervention threshold value.

The method may comprise setting the predetermined excess speed value to a value substantially equal to the slip control system intervention threshold value multiplied by the number of driven wheels of the vehicle.

The method may comprise automatically causing the reduction in net torque applied to a wheel when its speed exceeds a predetermined one of the first and second vehicle speed values by the predetermined slip control system intervention threshold value.

Optionally the first vehicle speed value is set substantially equal to a speed of a slowest turning wheel of the vehicle.

The method may comprise causing a vehicle to operate in accordance with a target speed value by controlling an amount of brake torque applied by a braking system and in addition by controlling an amount of drive torque applied by a powertrain to one or more wheels of the vehicle.

The method may comprise causing the reduction in net torque applied to a wheel at least in part by application of brake torque to the wheel by means of a braking system and/or by causing a reduction in an amount of powertrain torque applied to the wheel.

Optionally, the first and second methods may be different.

Optionally, the first vehicle speed value is determined by substantially the same method as the second vehicle speed value.

In one aspect of the invention for which protection is sought there is provided a controller comprising at least one processor, the at least one processor being configured to implement the method of a preceding aspect.

In an aspect of the invention for which protection is sought there is provided a carrier medium carrying computer readable code for controlling a vehicle to carry out the method of a preceding aspect.

In another aspect of the invention for which protection is sought there is provided a computer program product executable on a processor so as to implement the method of any one of a preceding aspect.

In an aspect of the invention for which protection is sought there is provided a computer readable medium loaded with the computer program product of a preceding aspect.

In a further aspect of the invention for which protection is sought there is provided a processor arranged to implement the method or the computer program product of a preceding aspect.

In an aspect of the invention for which protection is sought there is provided a vehicle control system comprising a speed control system,
  the speed control system being configured automatically to attempt to cause a first measured vehicle speed value determined according to a first predetermined method to become or be maintained substantially equal to a predetermined target speed value at least in part by causing application of positive torque to one or more wheels, wherein the speed control system is configured to limit the amount of torque that may be demanded of a powertrain in dependence at least in part on the target speed value and a second measured vehicle speed value determined according to a second predetermined method different from the first.

Optionally, the control system is configured to limit the amount of torque that may be demanded of the powertrain in dependence at least in part on the target speed value and a second measured vehicle speed value by substantially preventing an increase in the amount of torque that may be demanded of the powertrain above an instant amount of torque demanded of the powertrain.

The control system may be configured to limit the amount of torque that may be demanded of the powertrain to the instant amount when a predetermined condition is met in respect of the mean wheel speed value and vehicle reference speed value.

That is, the control system may be configured to limit the amount of torque that may be demanded of the powertrain to the amount being demanded when the predetermined condition is met.

Optionally, the predetermined condition includes the condition that the sum of the target speed value and an intervention factor exceeds the mean wheel speed value.

In one aspect of the invention for which protection is sought there is provided a vehicle control system comprising a speed control system, the speed control system being configured automatically to attempt to cause a vehicle to operate in accordance with a target speed value by causing a first vehicle reference speed value determined according to a first predetermined method to become or be maintained substantially equal to the predetermined target speed value at least in part by causing application of positive drive torque to one or more wheels by means of a powertrain, wherein the speed control system is configured to impose a constraint on the amount of driving torque that may be demanded of the powertrain in dependence on the target speed value and a second vehicle reference speed value determined according to a second predetermined method different from the first, said a second predetermined method being based on the mean speed of the driven wheels of the vehicle.

In one aspect of the invention for which protection is sought there is provided a method of controlling a vehicle, comprising:

when a speed control system is in an active mode and not in a non-active mode, automatically attempting to cause a vehicle to operate in accordance with a target speed value by causing a first measured vehicle speed value determined according to a first predetermined method to become or be maintained substantially equal to the predetermined target speed value at least in part by causing application of positive drive torque to one or more wheels, the method comprising limiting the amount of driving torque that may be demanded of a powertrain to a predetermined torque limit value when a predetermined condition is met in respect of the target speed value and a second measured vehicle speed value determined according to a second predetermined method different from the first Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

The invention will now be described by way of example only with reference to the following figures in which.

DETAILED DESCRIPTION

References herein to a block such as a function block are to be understood to include reference to software code for performing the function or action specified which may be an output that is provided responsive to one or more inputs. The code may be in the form of a software routine or function called by a main computer program, or may be code forming part of a flow of code not being a separate routine or function. Reference to function block is made for ease of explanation of the manner of operation of embodiments of the present invention.

Figure 1:
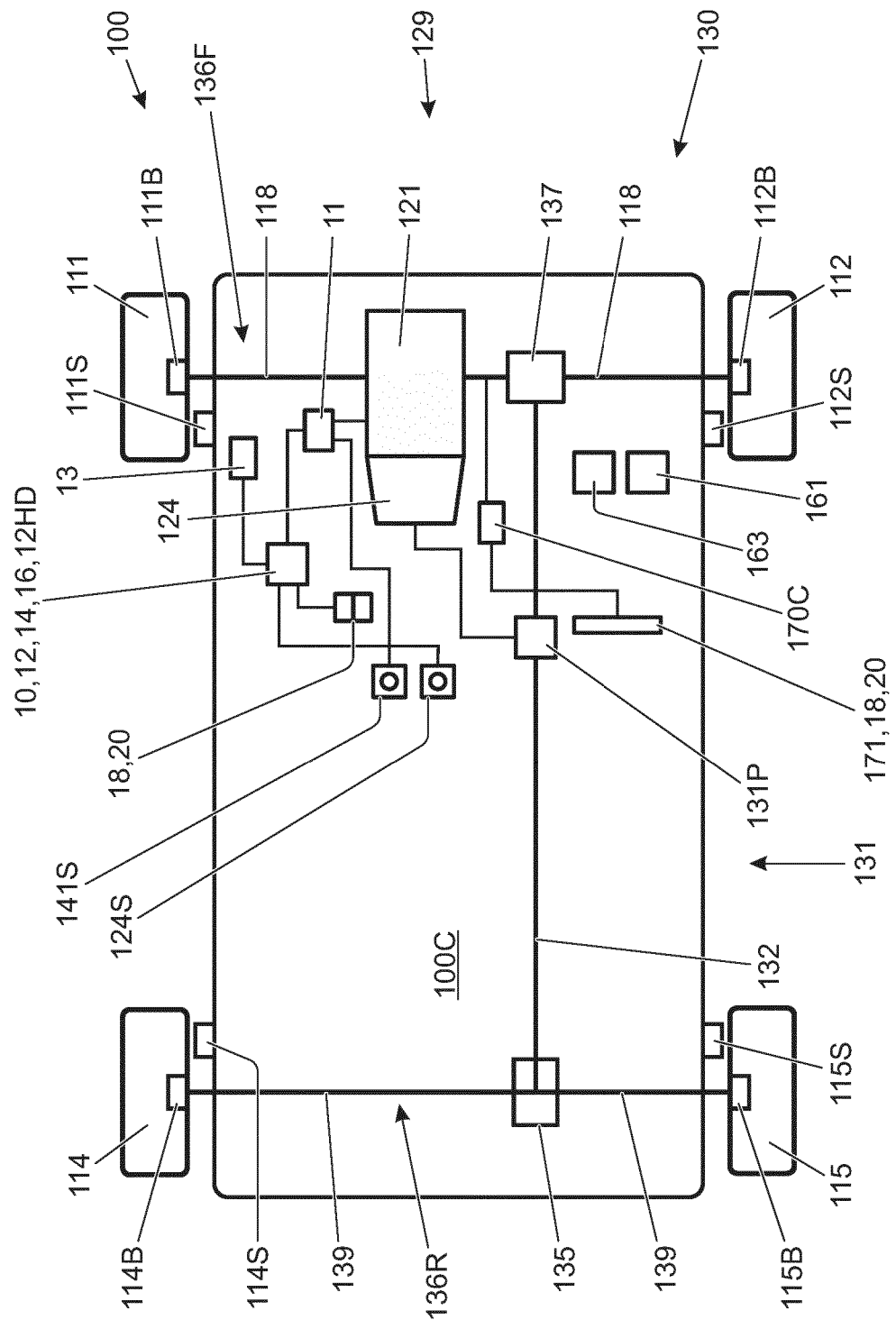
FIG. 1 is a schematic illustration of a vehicle according to an embodiment of the invention in plan view.
Figure 2:
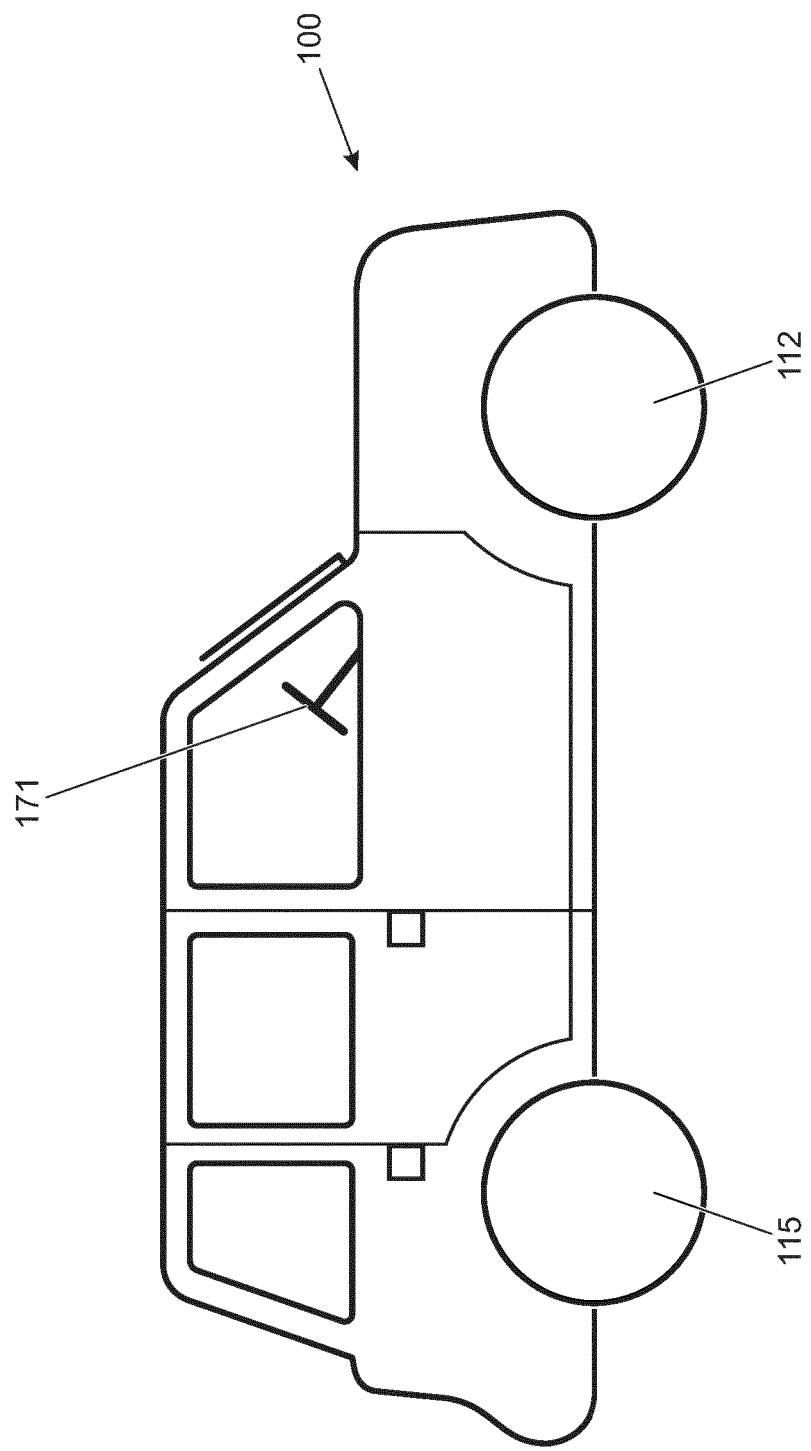
FIG. 2 shows the vehicle of FIG. 1 in side view.

FIG. 1 shows a vehicle 100 according to an embodiment of the present invention. The vehicle 100 has a powertrain 129 that includes an engine 121 that is connected to a driveline 130 via an automatic transmission 124. It is to be understood that embodiments of the present invention are also suitable for use in vehicles with manual transmissions, continuously variable transmissions or any other suitable transmission.

In the embodiment of FIG. 1 the transmission 124 may be set to one of a plurality of transmission operating modes, being a park mode, a reverse mode, a neutral mode, a drive mode or a sport mode, by means of a transmission mode selector dial 124S. The selector dial 124S provides an output signal to a powertrain controller 11 in response to which the powertrain controller 11 causes the transmission 124 to operate in accordance with the selected transmission mode.

The driveline 130 is arranged to drive a pair of front vehicle wheels 111,112 by means of a front differential 137 and a pair of front drive shafts 118. The driveline 130 also comprises an auxiliary driveline portion 131 arranged to drive a pair of rear wheels 114, 115 by means of an auxiliary driveshaft or prop-shaft 132, a rear differential 135 and a pair of rear driveshafts 139. The front wheels 111, 112 in combination with the front drive shafts 118 and front differential 137 may be referred to as a front axle 136F. The rear wheels 114, 115 in combination with rear drive shafts 139 and rear differential 135 may be referred to as a rear axle 136R.

The wheels 111, 112, 114, 115 each have a respective brake 111B, 112B, 114B, 115B. Respective speed sensors 111S, 112S, 114S, 115S are associated with each wheel 111, 112, 114, 115 of the vehicle 100. The sensors 111S, 112S, 114S, 115S are mounted to a chassis 100C of the vehicle 100 and arranged to measure a speed of the corresponding wheel.

Embodiments of the invention are suitable for use with vehicles in which the transmission is arranged to drive only a pair of front wheels or only a pair of rear wheels (i.e. front wheel drive vehicles or rear wheel drive vehicles) or selectable two wheel drive/four wheel drive vehicles. In the embodiment of FIG. 1 the transmission 124 is releasably connectable to the auxiliary driveline portion 131 by means of a power transfer unit (PTU) 131P, allowing operation in a two wheel drive mode or a four wheel drive mode. It is to be understood that embodiments of the invention may be suitable for vehicles having more than four wheels or less than four wheels, for example two or three wheeled vehicles.

Figure 3:
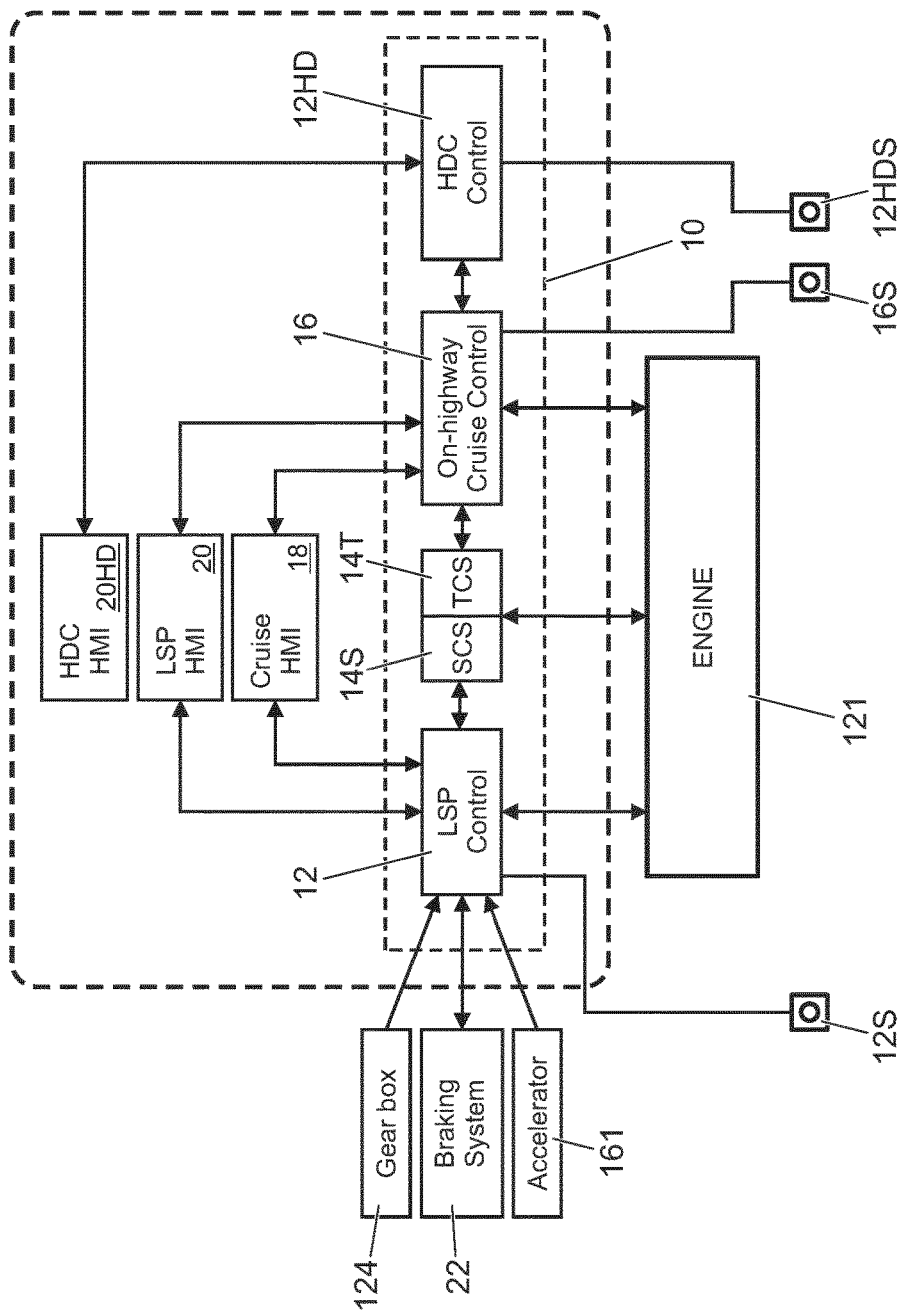
FIG. 3 is a high level schematic diagram of an embodiment of the vehicle speed control system of the present invention, including a cruise control system and a low-speed progress control system.

A control system for the vehicle 100 includes a central controller 10, referred to as a vehicle control unit (VCU) 10, the powertrain controller 11, a brake controller 13 and a steering controller 170C. The brake controller 13 is an anti-lock braking system (ABS) controller 13 and forms part of a braking system 22 (FIG. 3). The VCU 10 receives and outputs a plurality of signals to and from various sensors and subsystems (not shown) provided on the vehicle. The VCU 10 includes a low-speed progress (LSP) control system 12 shown in FIG. 3, a stability control system (SCS) 14S, a traction control system (TCS) 14T, a cruise control system 16 and a Hill Descent Control (HDC) system 12HD. The SCS 14S improves stability of the vehicle 100 by detecting and managing loss of traction when cornering. When a reduction in steering control is detected, the SCS 14S is configured automatically to command a brake controller 13 to apply one or more brakes 111B, 112B, 114B, 115B of the vehicle 100 to help to steer the vehicle 100 in the direction the user wishes to travel. If excessive wheel spin is detected, the TCS 14S is configured to reduce wheel spin by application of brake force in combination with a reduction in powertrain drive torque. In the embodiment shown the SCS 14S and TCS 14T are implemented by the VCU 10. In some alternative embodiments the SCS 14S and/or TCS 14T may be implemented by the brake controller 13. Further alternatively, the SCS 14S and/or TCS 14T may be implemented by separate controllers.

The SCS 14S, TCS 14T, ABS controller 13 and HDC system 12HD provide outputs indicative of, for example, SCS activity, TCS activity, ABS activity, brake interventions on individual wheels and engine torque requests from the VCU 10 to the engine 121 in the event a wheel slip event occurs. Each of the aforementioned events indicate that a wheel slip event has occurred. Other vehicle sub-systems such as a roll stability control system or the like may also be present.

For purposes of this disclosure, it is to be understood that the controller(s) described herein can each comprise a control unit or computational device having one or more electronic processors. Vehicle 100 and/or a subsystem thereof may comprise a single control unit or electronic controller or alternatively different functions of the controller(s) may be embodied in, or hosted in, different control units or controllers. As used herein, the term "control unit" will be understood to include both a single control unit or controller and a plurality of control units or controllers collectively operating to provide the required control functionality. A set of instructions could be provided which, when executed, cause said controller(s) or control unit(s) to implement the control techniques described herein (including the method(s) described below). The set of instructions may be embedded in one or more electronic processors, or alternatively, the set of instructions could be provided as software to be executed by one or more electronic processor(s). For example, a first controller may be implemented in software run on one or more electronic processors, and one or more other controllers may also be implemented in software run on or more electronic processors, optionally the same one or more processors as the first controller. It will be appreciated, however, that other arrangements are also useful, and therefore, the present invention is not intended to be limited to any particular arrangement. In any event, the set of instructions described above may be embedded in a computer-readable storage medium (e.g., a non-transitory storage medium) that may comprise any mechanism for storing information in a form readable by a machine or electronic processors/computational device, including, without limitation: a magnetic storage medium (e.g., floppy diskette); optical storage medium (e.g., CD-ROM); magneto optical storage medium; read only memory (ROM); random access memory (RAM); erasable programmable memory (e.g., EPROM ad EEPROM); flash memory; or electrical or other types of medium for storing such information/instructions.

Figure 5:
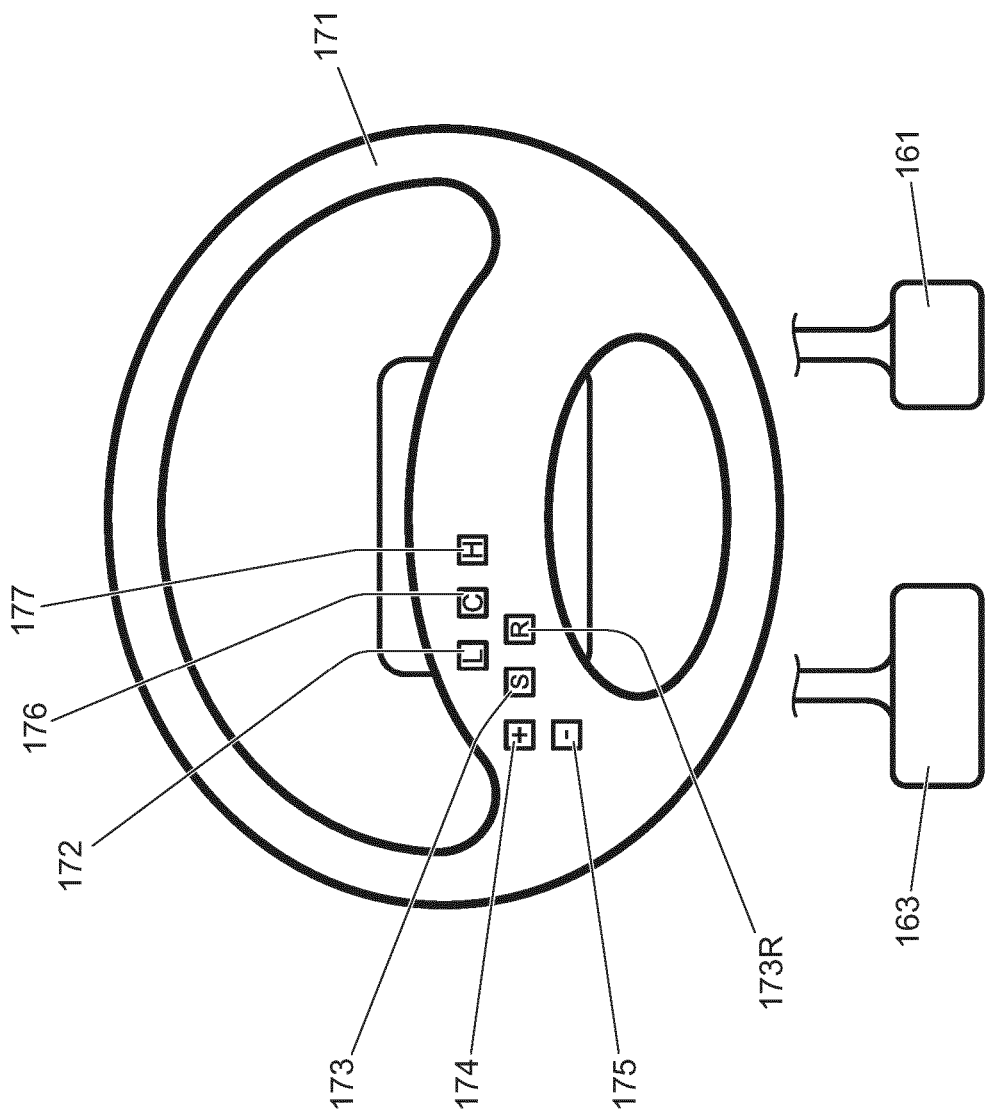
FIG. 5 illustrates a steering wheel and brake and accelerator pedals of a vehicle according to an embodiment of the present invention.

As noted above the vehicle 100 includes a cruise control system 16 which is operable to automatically maintain vehicle speed at a selected speed when the vehicle is travelling at speeds in excess of 25 kph. The cruise control system 16 is provided with a cruise control HMI (human machine interface) 18 by which means the user can input a target vehicle speed to the cruise control system 16 in a known manner. In one embodiment of the invention, cruise control system input controls are mounted to a steering wheel 171 (FIG. 5). The cruise control system 16 may be switched on by pressing a cruise control system selector button 176. When the cruise control system 16 is switched on, depression of a 'set-speed' control 173 sets the current value of a cruise control set-speed parameter, cruise_set-speed to the current vehicle speed. Depression of a '+' button 174 allows the value of cruise_set-speed to be increased whilst depression of a '−' button 175 allows the value of cruise_set-speed to be decreased. A resume button 173R is provided that is operable to control the cruise control system 16 to resume speed control at the instant value of cruise_set-speed following driver over-ride. It is to be understood that known on-highway cruise control systems including the present system 16 are configured so that, in the event that the user depresses the brake or, in the case of vehicles with a manual transmission, a clutch pedal, the cruise control function is cancelled and the vehicle 100 reverts to a manual mode of operation which requires accelerator pedal input by a user in order to maintain vehicle speed. In addition, detection of a wheel slip event, as may be initiated by a loss of traction, also has the effect of cancelling the cruise control function. Speed control by the system 16 is resumed if the driver subsequently depresses the resume button 173R.

The cruise control system 16 monitors vehicle speed and any deviation from the target vehicle speed is adjusted automatically so that the vehicle speed is maintained at a substantially constant value, typically in excess of 25 kph. In other words, the cruise control system is ineffective at speeds lower than 25 kph. The cruise control HMI 18 may also be configured to provide an alert to the user about the status of the cruise control system 16 via a visual display of the HMI 18. In the present embodiment the cruise control system 16 is configured to allow the value of cruise_set-speed to be set to any value in the range 25-150 kph.

The LSP control system 12 also provides a speed-based control system for the user which enables the user to select a very low target speed at which the vehicle can progress without any pedal inputs being required by the user. Low-speed speed control (or progress control) functionality is not provided by the on-highway cruise control system 16 which operates only at speeds above 25 kph.

The LSP control system 12 is activated by means of a LSP control system selector button 172 mounted on the steering wheel 171. The system 12 is operable to apply selective powertrain, traction control and braking actions to one or more wheels of the vehicle 100, collectively or individually, to maintain the vehicle 100 at the desired speed.

The LSP control system 12 is configured to allow a user to input a desired value of set-speed parameter, LSP_set-speed to the LSP control system 12 via a low-speed progress control HMI (LSP HMI) 20 (FIG. 1, FIG. 3) which shares certain input buttons 173-175 with the cruise control system 16 and HDC control system 12HD. Provided the vehicle speed is within the allowable range of operation of the LSP control system (which is the range from 2 to 30 kph in the present embodiment although other ranges are also useful) the LSP control system 12 controls vehicle speed in accordance with the value of LSP_set-speed. Unlike the cruise control system 16, the LSP control system 12 is configured to operate independently of the occurrence of a traction event. That is, the LSP control system 12 does not cancel speed control upon detection of wheel slip. Rather, the LSP control system 12 actively manages vehicle behaviour when slip is detected.

The LSP control HMI 20 is provided in the vehicle cabin so as to be readily accessible to the user. The user of the vehicle 100 is able to input to the LSP control system 12, via the LSP HMI 20, an indication of the speed at which the user desires the vehicle to travel (referred to as "the target speed") by means of the 'set-speed' button 173 and the '+'/'−' buttons 174, 175 in a similar manner to the cruise control system 16. The LSP HMI 20 also includes a visual display upon which information and guidance can be provided to the user about the status of the LSP control system 12.

The LSP control system 12 receives an input from the braking system 22 of the vehicle indicative of the extent to which the user has applied braking by means of the brake pedal 163. The LSP control system 12 also receives an input from an accelerator pedal 161 indicative of the extent to which the user has depressed the accelerator pedal 161. An input is also provided to the LSP control system 12 from the transmission or gearbox 124. This input may include signals representative of, for example, the speed of an output shaft of the gearbox 124, torque converter slip and a gear ratio request. Other inputs to the LSP control system 12 include an input from the cruise control HMI 18 which is representative of the status (ON/OFF) of the cruise control system 16, and an input from the LSP control HMI 20.

The HDC system 12HD is configured to limit vehicle speed when descending a gradient. When the HDC system 12HD is active, the system 12HD controls the braking system 22 (via brake controller 13) in order to limit vehicle speed to a value corresponding to that of a HDC set-speed parameter HDC_set-speed which may be set by a user. The HDC set-speed may also be referred to as an HDC target speed. Provided the user does not override the HDC system by depressing the accelerator pedal when the HDC system 12HD is active, the HDC system 12HD controls the braking system 22 to prevent vehicle speed from exceeding the value of HDC_set-speed. In the present embodiment the HDC system 12HD is not operable to apply positive drive torque. Rather, the HDC system 12HD is only operable to apply negative brake torque by means of the braking system 22.

A HDC system HMI 20HD is provided by means of which a user may control the HDC system 12HD, including setting the value of HDC_set-speed. An HDC system selector button 177 is provided on the steering wheel 171 by means of which a user may activate the HDC system 12HD to control vehicle speed.

As noted above, the HDC system 12HD is operable to allow a user to set a value of HDC set-speed parameter HDC_set-speed and to adjust the value of HDC_set-speed using the same controls as the cruise control system 16 and LSP control system 12. Thus, in the present embodiment, when the HDC system 12HD is controlling vehicle speed, the HDC system set-speed may be increased, decreased or set to an instant speed of the vehicle in a similar manner to the set-speed of the cruise control system 16 and LSP control system, using the same control buttons 173, 173R, 174, 175. The HDC system 12HD is operable to allow the value of HDC_set-speed to be set to any value in the range from 2-30 kph.

If the HDC system 12HD is selected when the vehicle 100 is travelling at a speed of 50 kph or less and no other speed control system is in operation, the HDC system 12HD sets the value of HDC_set-speed to a value selected from a look-up table. The value output by the look-up table is determined in dependence on the identity of the currently selected transmission gear, the currently selected PTU gear ratio (Hi/LO) and the currently selected driving mode. The HDC system 12HD then applies the powertrain 129 and/or braking system 22 to slow the vehicle 100 to the HDC system set-speed provided the driver does not override the HDC system 12HD by depressing the accelerator pedal 161. The HDC system 12HD is configured to slow the vehicle 100 to the set-speed value at a deceleration rate not exceeding a maximum allowable rate. The rate is set as 1.25 ms-2 in the present embodiment, however other values may be useful in some embodiments. If the user subsequently presses the 'set-speed' button 173 the HDC system 12HD sets the value of HDC_set-speed to the instant vehicle speed provided the instant speed is 30 kph or less. If the HDC system 12HD is selected when the vehicle 100 is travelling at a speed exceeding 50 kph, the HDC system 12HD ignores the request and provides an indication to the user that the request has been ignored.

It is to be understood that the VCU 10 is configured to implement a known Terrain Response (TR)® System of the kind described above in which the VCU 10 controls settings of one or more vehicle systems or sub-systems such as the powertrain controller 11 in dependence on a selected driving mode. The driving mode may be selected by a user by means of a driving mode selector 141S (FIG. 1). The driving modes may also be referred to as terrain modes, terrain response modes, or control modes. In the embodiment of FIG. 1 four driving modes are provided: an 'on-highway' driving mode suitable for driving on a relatively hard, smooth driving surface where a relatively high surface coefficient of friction exists between the driving surface and wheels of the vehicle; a 'sand' driving mode suitable for driving over sandy terrain; a 'grass, gravel or snow' driving mode suitable for driving over grass, gravel or snow, a 'rock crawl' driving mode suitable for driving slowly over a rocky surface; and a 'mud and ruts' driving mode suitable for driving in muddy, rutted terrain. Other driving modes may be provided in addition or instead.

In some embodiments, the LSP control system 12 may be in either one of an active condition, a standby condition and an 'off' condition. In the active condition, the LSP control system 12 actively manages vehicle speed by controlling powertrain torque and braking system torque. In the standby condition, the LSP control system 12 does not control vehicle speed until a user presses the resume button 173R or the 'set speed' button 173. In the off condition the LSP control system 12 is not responsive to input controls until the LSP control system selector button 172 is depressed.

In the present embodiment the LSP control system 12 is also operable to assume an intermediate condition similar to that of the active mode but in which the LSP control system 12 is prevented from commanding the application of positive drive torque to one or more wheels of the vehicle 100 by the powertrain 129. Thus, only braking torque may be applied, by means of the braking system 22 and/or powertrain 129. Other arrangements are also useful.

With the LSP control system 12 in the active condition, the user may increase or decrease the vehicle set-speed by means of the '+' and '−' buttons 174, 175. In addition, the user may optionally also increase or decrease the vehicle set-speed by lightly pressing the accelerator or brake pedals 161, 163 respectively. In some embodiments, with the LSP control system 12 in the active condition the '+' and '−' buttons 174, 175 may be disabled such that adjustment of the value of LSP_set-speed can only be made by means of the accelerator and brake pedals 161, 163. This latter feature may prevent unintentional changes in set-speed from occurring, for example due to accidental pressing of one of the '+' or '−' buttons 174, 175. Accidental pressing may occur for example when negotiating difficult terrain where relatively large and frequent changes in steering angle may be required. Other arrangements are also useful.

It is to be understood that in the present embodiment the LSP control system 12 is operable to cause the vehicle to travel in accordance with a value of set-speed in the range from 2-30 kph whilst the cruise control system 16 is operable to cause the vehicle to travel in accordance with a value of set-speed in the range from 25-150 kph although other values are also useful. If the LSP control system 12 is selected when the vehicle speed is above 30 kph but less than or substantially equal to 50 kph, the LSP control system 12 assumes the intermediate mode. In the intermediate mode, if the driver releases the accelerator pedal 161 whilst travelling above 30 kph the LSP control system 12 deploys the braking system 22 to slow the vehicle 100 to a value of set-speed corresponding to the value of parameter LSP_set-speed. Once the vehicle speed falls to 30 kph or below, the LSP control system 12 assumes the active condition in which it is operable to apply positive drive torque via the powertrain 129, as well as brake torque via the powertrain 129 (via engine braking) and the braking system 22 in order to control the vehicle in accordance with the LSP_set-speed value. If no LSP set-speed value has been set, the LSP control system 12 assumes the standby mode.

It is to be understood that if the LSP control system 12 is in the active mode, operation of the cruise control system 16 is inhibited. The two systems 12, 16 therefore operate independently of one another, so that only one can be operable at any one time, depending on the speed at which the vehicle is travelling.

In some embodiments, the cruise control HMI 18 and the LSP control HMI 20 may be configured within the same hardware so that, for example, the speed selection is input via the same hardware, with one or more separate switches being provided to switch between the LSP input and the cruise control input.

Figure 4:
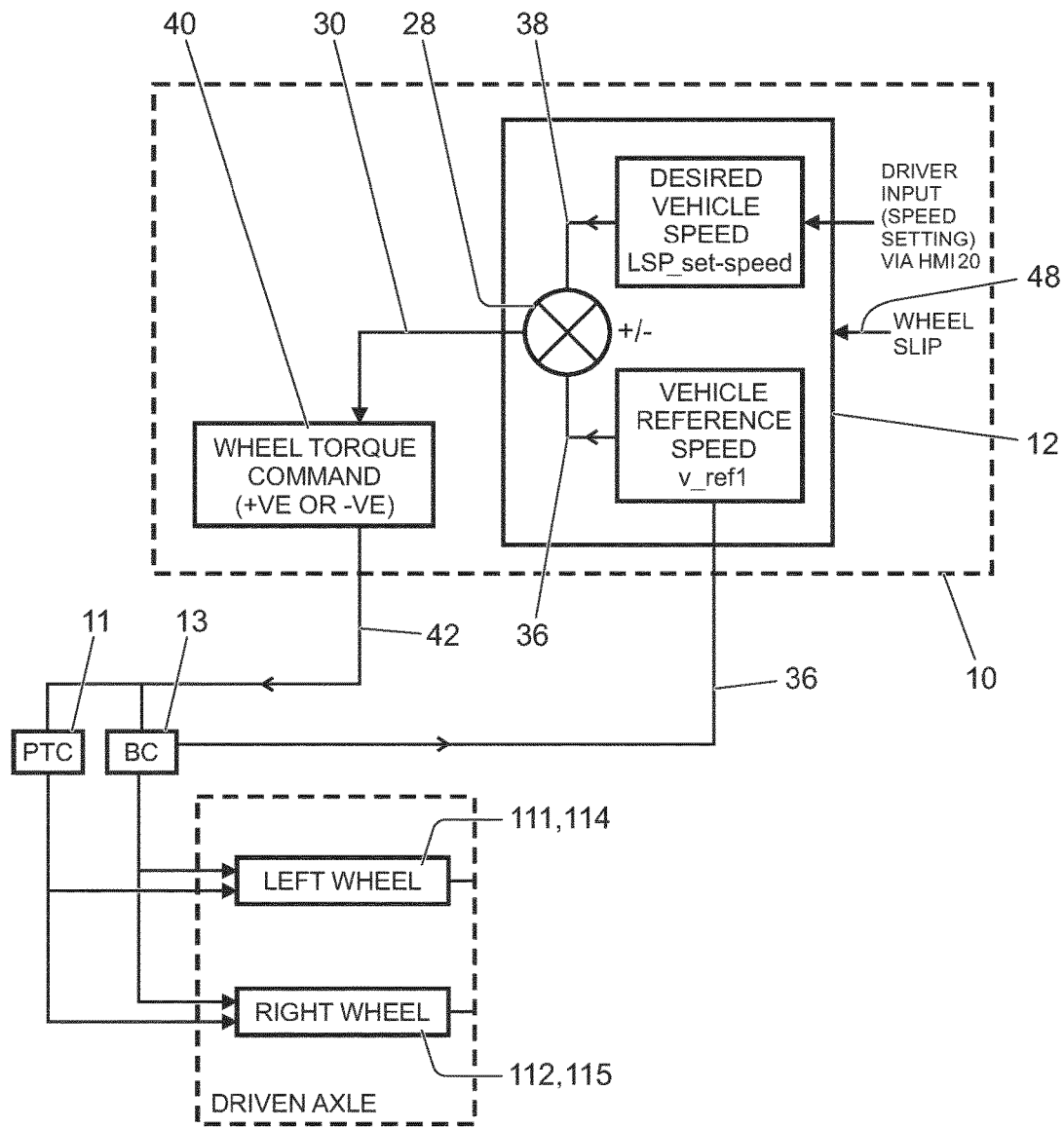
FIG. 4 is a schematic diagram of further features of the vehicle speed control system in FIG. 3.

FIG. 4 illustrates the means by which vehicle speed is controlled in the LSP control system 12. As described above, a speed selected by a user (set-speed) is input to the LSP control system 12 via the LSP control HMI 20. Brake controller 11 provides a signal indicative of a first vehicle reference speed value, v_ref1, via a signal 36 to the LSP control system 12. The reference speed value is indicative of vehicle speed over ground and is set substantially equal to the speed of the slowest turning wheel, v_slow_wheel. The LSP control system 12 includes a comparator 28 which compares a signal 38 indicative of the value of LSP_set-speed (also referred to as a 'target speed') with the signal 36 indicative of the first reference speed value v_ref1 and provides an output signal 30 indicative of the comparison. The output signal 30 is provided to an evaluator unit 40 of the VCU 10 which interprets the output signal 30 as either a demand for additional torque to be applied to the vehicle wheels 111-115, or for a reduction in torque applied to the vehicle wheels 111-115, depending on whether the vehicle speed needs to be increased or decreased to maintain the speed LSP_set-speed. An increase in torque is generally accomplished by increasing the amount of powertrain torque delivered to a given position of the powertrain, for example an engine output shaft, a wheel or any other suitable location. A decrease in torque at a given wheel to a value that is less positive or more negative may be accomplished by decreasing powertrain torque delivered to a wheel and/or by increasing a braking force on a wheel. It is to be understood that in some embodiments in which a powertrain 129 has one or more electric machines operable as a generator, negative torque may be applied by the powertrain 129 to one or more wheels by the electric machine operated as a generator. Negative torque may also be applied by means of engine braking in some circumstances, depending at least in part on the speed at which the vehicle 100 is moving. If one or more electric machines are provided that are operable as propulsion motors, positive drive torque may be applied by means of the one or more electric machines operated as propulsion motors.

An output 42 from the evaluator unit 40 is provided to the powertrain controller 11 and brake controller 13 which in turn control a net torque applied to the vehicle wheels 111-115. The net torque may be increased or decreased depending on whether the evaluator unit 40 demands positive or negative torque. In order to cause application of the necessary positive or negative torque to the wheels, the evaluator unit 40 may command that positive or negative torque is applied to the vehicle wheels by the powertrain 129 and/or that a braking force is applied to the vehicle wheels by the braking system 22, either or both of which may be used to implement the change in torque that is necessary to attain and maintain a required vehicle speed LSP_set-speed. In the illustrated embodiment the torque is applied to the vehicle wheels individually so as to maintain the vehicle at the required speed, but in another embodiment torque may be applied to the wheels collectively to maintain the required speed. In some embodiments, the powertrain controller 11 may be operable to control an amount of torque applied to one or more wheels by controlling a driveline component such as a rear drive unit, front drive unit, differential or any other suitable component. For example, one or more components of the driveline 130 may include one or more clutches operable to allow an amount of torque applied to one or more wheels to be varied. Other arrangements are also useful.

Where a powertrain 129 includes one or more electric machines, for example one or more propulsion motors and/or generators, the powertrain controller 11 may be operable to modulate torque applied to one or more wheels by means of one or more electric machines.

The LSP control system 12 also receives a signal 48 indicative of a wheel slip event having occurred. This may be the same signal 48 that is supplied to the on-highway cruise control system 16 of the vehicle, and which in the case of the latter triggers an override or inhibit mode of operation in the on-highway cruise control system 16 so that automatic control of vehicle speed by the on-highway cruise control system 16 is suspended or cancelled. However, the LSP control system 12 is not arranged to cancel or suspend operation in dependence on receipt of a wheel slip signal 48 indicative of wheel slip. Rather, the system 12 is arranged to monitor and subsequently manage wheel slip so as to reduce driver workload. During a slip event, the LSP control system 12 continues to compare the measured vehicle speed with the value of LSP_set-speed, and continues to control automatically the torque applied to the vehicle wheels so as to maintain vehicle speed at the selected value. It is to be understood therefore that the LSP control system 12 is configured differently to the cruise control system 16, for which a wheel slip event has the effect of overriding the cruise control function so that manual operation of the vehicle must be resumed, or speed control by the cruise control system 12 resumed by pressing the resume button 173R or set-speed button 173. In a further embodiment of the present invention (not shown) a wheel slip signal 48 is derived not just from a comparison of wheel speeds, but further refined using sensor data indicative of the vehicle's speed over ground. Such a speed over ground determination may be made via global positioning (GPS) data, or via a vehicle mounted radar or laser based system arranged to determine the relative movement of the vehicle 100 and the ground over which it is travelling. A camera system may be employed for determining speed over ground in some embodiments. Control of wheel slip will be discussed in further detail below.

At any stage of the LSP control process the user can override the function by depressing the accelerator pedal 161 and/or brake pedal 163 to adjust the vehicle speed in a positive or negative sense. However, in the event that a wheel slip event is detected via signal 48, the LSP control system 12 remains active and control of vehicle speed by the LSP control system 12 is not suspended. As shown in FIG. 4, this may be implemented by providing a wheel slip event signal 48 to the LSP control system 12 which is then managed by the LSP control system 12. In the embodiment shown in FIG. 1 the SCS 14S generates the wheel slip event signal 48 and supplies it to the LSP control system 12 and cruise control system 16.

A wheel slip event is triggered when a loss of traction occurs at any one of the vehicle wheels. Wheels and tyres may be more prone to losing traction when travelling for example on snow, ice, mud or sand and/or on steep gradients or cross-slopes. A vehicle 100 may also be more prone to losing traction in environments where the terrain is more uneven or slippery compared with driving on a highway in normal on-road conditions. Embodiments of the present invention therefore find particular benefit when the vehicle 100 is being driven in an off-road environment, or in conditions in which wheel slip may commonly occur. Manual operation in such conditions can be a difficult and often stressful experience for the driver and may result in an uncomfortable ride.

The vehicle 100 is also provided with additional sensors (not shown) which are representative of a variety of different parameters associated with vehicle motion and status. These may be inertial systems unique to the LSP or HDC control system 12, 12HD or part of an occupant restraint system or any other sub-system which may provide data from sensors such as gyros and/or accelerometers that may be indicative of vehicle body movement and may provide a useful input to the LSP and/or HDC control systems 12, 12HD. The signals from the sensors provide, or are used to calculate, a plurality of driving condition indicators (also referred to as terrain indicators) which are indicative of the nature of the terrain conditions over which the vehicle is travelling.

The sensors (not shown) on the vehicle 100 include, but are not limited to, sensors which provide continuous sensor outputs to the VCU 10, including wheel speed sensors, as mentioned previously and as shown in FIG. 1, an ambient temperature sensor, an atmospheric pressure sensor, tyre pressure sensors, wheel articulation sensors, gyroscopic sensors to detect vehicular yaw, roll and pitch angle and rate, a vehicle speed sensor, a longitudinal acceleration sensor, an engine torque sensor (or engine torque estimator), a steering angle sensor, a steering wheel speed sensor, a gradient sensor (or gradient estimator), a lateral acceleration sensor which may be part of the SCS 14S, a brake pedal position sensor, a brake pressure sensor, an accelerator pedal position sensor, longitudinal, lateral and vertical motion sensors, and water detection sensors forming part of a vehicle wading assistance system (not shown). In other embodiments, only a selection of the aforementioned sensors may be used.

The VCU 10 also receives a signal from the steering controller 170C. The steering controller 170C is in the form of an electronic power assisted steering unit (ePAS unit). The steering controller 170C provides a signal to the VCU 10 indicative of the steering force being applied to steerable road wheels 111, 112 of the vehicle 100. This force corresponds to that applied by a user to the steering wheel 171 in combination with steering force generated by the ePAS unit 170C.

The VCU 10 evaluates the various sensor inputs to determine the probability that each of a plurality of different control modes (driving modes) for the vehicle subsystems is appropriate, with each control mode corresponding to a particular terrain type over which the vehicle is travelling (for example, mud and ruts, sand, grass/gravel/snow).

If the user has selected operation of the vehicle in an automatic driving mode selection condition, the VCU 10 then selects the most appropriate one of the control modes and is configured automatically to control the subsystems according to the selected mode. This aspect of the invention is described in further detail in our co-pending patent application nos. GB2492748, GB2492655 and GB2499252, the contents of each of which is incorporated herein by reference.

The nature of the terrain over which the vehicle is travelling (as determined by reference to the selected control mode) may also be utilised in the LSP control system 12 to determine an appropriate increase or decrease in vehicle speed. For example, if the user selects a value of LSP_set-speed that is not suitable for the nature of the terrain over which the vehicle is travelling, the system 12 is operable to automatically adjust the vehicle speed downwards by reducing the speed of the vehicle wheels. In some cases, for example, the user selected speed may not be achievable or appropriate over certain terrain types, particularly in the case of uneven or rough surfaces. If the system 12 selects a set-speed that differs from the user-selected set-speed, a visual indication of the speed constraint is provided to the user via the LSP HMI 20 to indicate that an alternative speed has been adopted.

As described above, the VCU 10 is configured to implement a TCS 14T in which the VCU 10 commands selective application of brake force to one or more wheels of the vehicle 100 in order to reduce slip of the one or more wheels when certain conditions are met.

It is to be understood that in some embodiments the TCS 14T may, in addition to or instead of commanding application of brake force, cause a reduction in powertrain torque applied to one or more wheels, for example by causing a reduction in engine speed, by causing slip of one or more powertrain clutches or by any other suitable method. Intervention by the TCS 14T to reduce slip is referred to herein as a 'TC event'. It is to be understood that the LSP control system 12 remains active when a TC event takes place, i.e. the LSP control system 12 does not cancel speed control upon or following the occurrence of a TC event. In contrast, in the case of a conventional cruise control system such as cruise control system 16, speed control by the cruise control system 16 is immediately suspended if a TC event occurs.

When the LSP control system 12 is not active, the TCS 14T is arranged to intervene and cause application of brake force to reduce wheel speed if a difference (or error) between the measured speed of any wheel and a second vehicle reference speed v_ref2 exceeds a prescribed value, TC_offset, which may be referred to as a TC intervention threshold value or TC offset value. In the present embodiment the TC intervention threshold value TC_offset is substantially 5 kph although other values may be useful in some embodiments. In some embodiments the value of TC_offset may be a function of v_ref2, increasing with increasing values of v_ref2. In the present embodiment, the second vehicle reference speed v_ref2 is calculated by the brake controller 13 using a vehicle reference speed calculation function.

The vehicle reference speed calculation function sets the value of v_ref2 equal to the mean speed of the driving wheels of the vehicle, v_mean_wheel, which in the case of a four wheel drive vehicle is the mean speed of each of the four driving wheels. Other methods of calculating a value of the second vehicle reference speed v_ref2 may be employed in some embodiments.

The LSP control system 12 is configured to control the vehicle 100 to travel at a speed substantially equal to LSP_set-speed subject to any requirement to reduce speed below this value, for example in dependence on the nature of terrain over which the vehicle 100 is travelling as described above. As noted above, in the present embodiment the LSP control system 12 employs the first vehicle reference speed value, v_ref1, as an LSP control system reference value of vehicle ground speed. Thus it is to be understood that the LSP control system 12 does not use the mean speed of all four wheels at a given moment in time as its reference speed value v_ref1.

As noted above, the TC function triggers a TC event if the speed of any driving wheel is greater than that of the first vehicle reference speed v_ref1 by more than the TC intervention threshold value TC_offset. The TC function therefore triggers application of the braking system 22 to reduce the speed of any wheel whose speed exceeds the first vehicle reference speed v_ref1 by more than the TC intervention threshold value, i.e. if the wheel speed is more than v_ref1+TC_offset. A possibility exists, however, that the vehicle 100 may be in a condition in which the vehicle 100 is stationary with one wheel stationary and three wheels rotating and slipping over the driving surface. It is to be understood that, under these conditions, the TCS 100 may fail to activate to reduce the speed of the rotating wheels, thereby reducing slip, because the value of vehicle reference speed used by the TCS 14T, v_ref1, will indicate that the vehicle 100 is not moving.

However, in the present embodiment, if the LSP control system 12 is in the active state, the LSP control system 12 is configured to implement a torque cap function in which the amount of positive drive torque that the LSP control system 12 is permitted to request is limited in dependence on the value of the mean speed of all four wheels 111, 112, 114, 115 of the vehicle 100, v_mean_wheel, and the value of LSP_set-speed. In the present embodiment the LSP control system 12 is configured to limit the amount of positive drive torque the LSP control system 12 may request by preventing any further increase in the instant amount of positive drive torque requested by the LSP control system 12 when the following condition is met:

$$v\_mean\_wheel > LSP\_set\text{-}speed + (TC\_offset*4)$$

In other words, if the mean speed of the four wheels of the vehicle 100, v_mean_wheel, exceeds the sum of the current value of LSP_set-speed and (TC_offset*4), the LSP control system 12 is configured to limit the amount of positive drive torque that it may request the powertrain to develop to the prevailing value, i.e. the value at the instant the above condition is met.

This feature has the advantage that the amount of torque a powertrain may develop may be limited in certain situations where a risk of a reduction in or loss of vehicle composure exists. For example, if a vehicle has an LSP control system that employs mean wheel speed in order to determine vehicle speed at a given moment in time, for example in the case of the embodiment described above in which a second vehicle reference speed value v_ref2 is set equal to the mean speed of the driving wheels, v_mean_wheel, a scenario may occur in which the vehicle is substantially stationary with one of four driving wheels stationary and in contact with an obstacle such as a rock or other step in a driving surface whilst the three other driving wheels are experiencing slip. The TCS 14T may fail to intervene to prevent excessive wheel slip until after the amount of powertrain torque PT_tq_rq demanded by the LSP control system approaches the maximum value the powertrain 129 is capable of developing. If the vehicle 100 develops sufficient traction to overcome the obstacle relatively abruptly, whilst the amount of powertrain torque PT_tq_rq developed by the powertrain 129 is at or close to the maximum value the powertrain 129 is capable of generating, the vehicle 100 may experience correspondingly abrupt acceleration, reducing vehicle composure.

Embodiments of the present invention address this problem by preventing an increase in the amount of positive drive torque PT_tq_rq that may be demanded by the LSP control system 12 once the mean wheel speed v_mean_wheel exceeds the value of LSP_set-speed by more than four times the value of TC_offset.

It is to be understood that, in the general case, where a vehicle has N wheels that are driven by the powertrain 129 the LSP control system 12 may be configured to limit the amount of positive drive torque the LSP control system 12 may request when the following condition is met:

$$v\_mean\_wheel > LSP\_set\text{-}speed + (TC\_offset*N)$$

Figure 6:
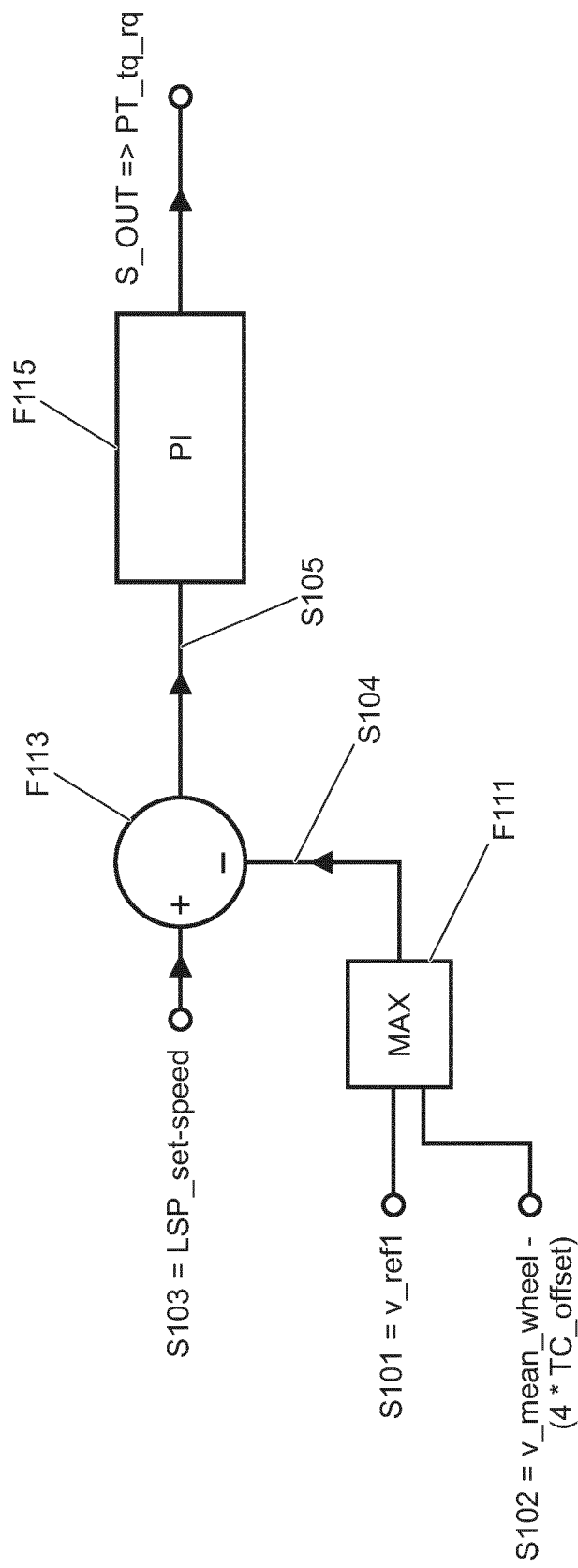
FIG. 6 is a schematic illustration of a portion of a speed control system of a vehicle according to an embodiment of the present invention.

FIG. 6 illustrates schematically a portion of the LSP control system 12 that implements the torque limit function described above. A maximiser function block F111 receives input signals S101 and S102 where S101=v_ref1 and S102=v_mean_wheel+(4*TC_offset). The maximiser function block F111 outputs a signal S104 which is set equal to the larger of S101 and S102.

Difference function block F113 receives input signals S103 and S104 where S103=LSP_set-speed. Function block F113 sets output signal S105 equal to the difference between the signals S103 and S104, i.e. S105=S103-S104.

Function block F115 is a proportional-integral (PI) control function block F115 that controls the amount of torque that the powertrain 129 is commanded to generate, via signal S_OUT. The value of PT_tq_rq is set equal to S_OUT.

It is to be understood that the PI control function block F115 is configured to attempt to cause the value of S105 to remain substantially equal to zero under normal conditions in which little or no wheel slip is occurring. Thus, the function block F115 attempts to maintain v_ref1 substantially equal to LSP_set-speed. Control function block F115 may be any suitable function block such as a proportional-integral-differential (PID) control function block or any other suitable function block.

It is to be understood that, when the value of [v_mean_wheel-(4*TC_offset)] is less than v_ref1 the signal S104 is set to the value of v_ref1. Since in the present embodiment v_ref1 is set to the speed of the slowest turning wheel, v_slow_wheel, the value of S104 will only exceed the value of v_ref1 if S102 exceeds S101, i.e. if the following condition is met:

$$v\_mean\_wheel - (4*TC\_offset) > v\_ref1$$

Accordingly, as a precaution, in the event that the above condition is met, and in addition (v_mean_wheel-(4*TC_offset)) is greater than LSP_set-speed, the value of signal S105 output by difference function block F113 will be negative and PI controller F115 will generate an output signal S_OUT that tends to limit or reduce the amount of powertrain torque that the powertrain 129 is commanded to develop. The PI controller F115 will therefore tend to prevent PT_tq_rq from increasing, for example by temporarily capping the maximum allowable value of PT_tq_rq at the prevailing value when the above conditions are met. The PI controller F115 may in addition reduce the value of PT_tq_rq in order to cause S105 to tend towards zero.

In some embodiments the LSP control system 12 may be configured actively to reduce the value of PT_tq_rq output to the powertrain controller 11 in addition to or instead of capping the maximum allowable value of PT_tq_rq. For example, in some embodiments the LSP control system 12 may gradually reduce the maximum allowable value of PT_tq_rq in order to attempt to prevent the above described conditions being met, i.e. that:

$$v\_mean\_wheel - (4*TC\_offset) > v\_ref1; \text{ and}$$

(v_mean_wheel-(4*TC_offset)) is greater than LSP_set-speed

Figure 7:
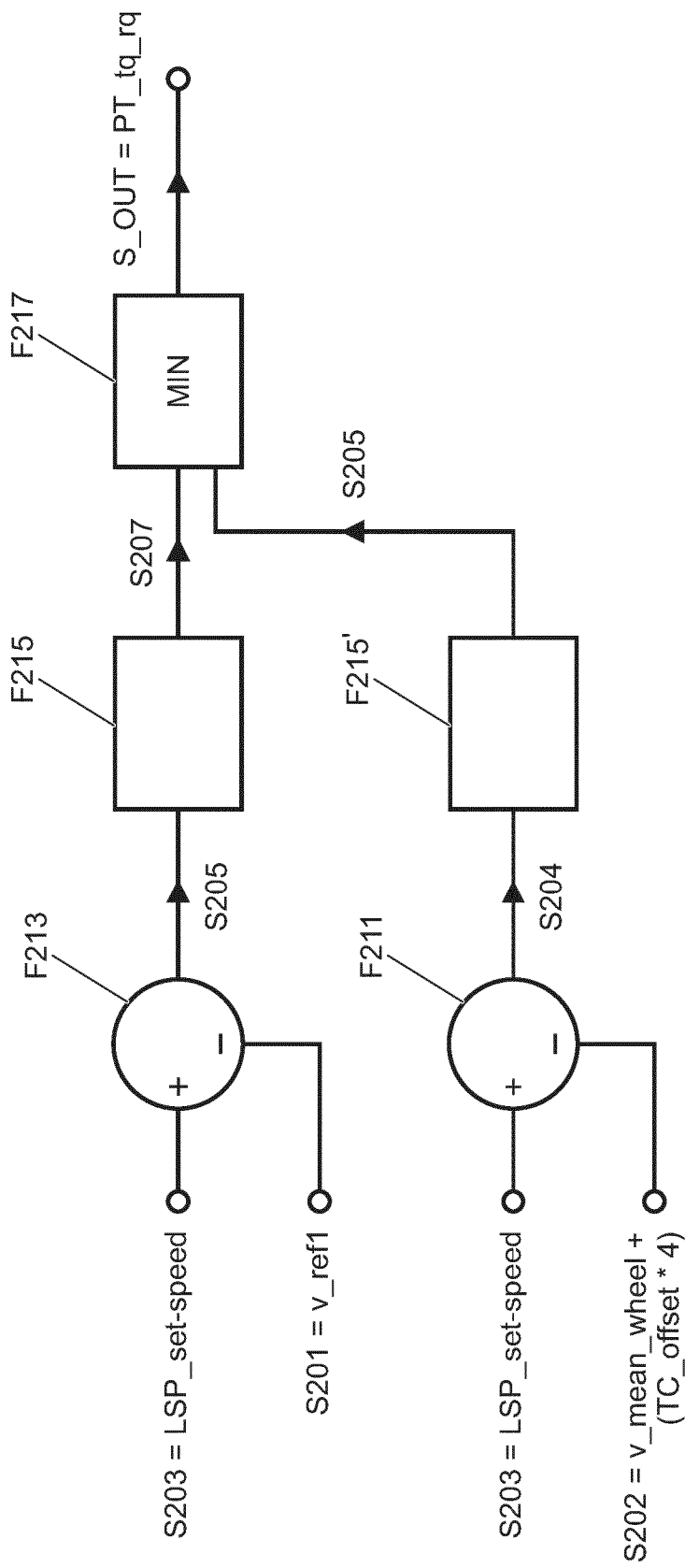
FIG. 7 is a schematic illustration of a portion of a speed control system of a vehicle according to a further embodiment of the present invention.

FIG. 7 illustrates schematically a portion of the LSP control system 12 of a vehicle according to a further embodiment of the present invention. Like features of the embodiment of FIG. 7 to those of the embodiment of FIG. 6 are shown with like reference signs incremented by 100.

The portion of the control system 12 illustrated has two difference function blocks F211, F213. Difference function block F211 receives input signals S202=(v_mean_wheel+TC_offset) and S203=LSP_set-speed. Function block F211 outputs a signal S204 which is set substantially equal to the difference between S202 and S203, i.e. S204=S203-S202.

Signal S204 is input to PI function block F215' which outputs a signal S205 to a minimiser function block F217. PI function block F215' implements a proportional-integral feedback control methodology in order to attempt to maintain the value of signal S204 substantially equal to zero.

Difference function block F213 receives input signals S203 and S201=v_ref1. Function block F213 outputs a signal S205 which is set substantially equal to the difference between S203 and S201, i.e. S205=S203-S201.

Signal S205 is input to PI function block F215 which outputs a signal S207 to the minimiser function block F217. PI function block F215 implements a proportional-integral feedback control methodology in a similar manner to function block F215' in order to attempt to maintain the value of signal S205 substantially equal to zero. In the present embodiment, function blocks F215 and F215' are configured in a substantially identical manner. That is, the respective output signals S207 and S205 of function blocks F215 and F215' would be substantially equal if corresponding input signals were substantially the same, i.e. if S202=S201.

Minimiser function block F217 is configured to output a signal S_OUT that is set equal to the lower of the two signals S205, S207 input thereto. Signal PT_tq_rq is set equal to output signal S_OUT.

It is to be understood that the embodiment of FIG. 7 implements control of the value of PT_tq_rq in a similar manner to the embodiment of FIG. 6, except that two PI function blocks F215, F215' are employed instead of one. It is to be understood that this may be advantageous in some embodiments. For example, in some embodiments the PI function blocks F215, F215' may be provided with different values of PI gain parameters.

Figure 8:
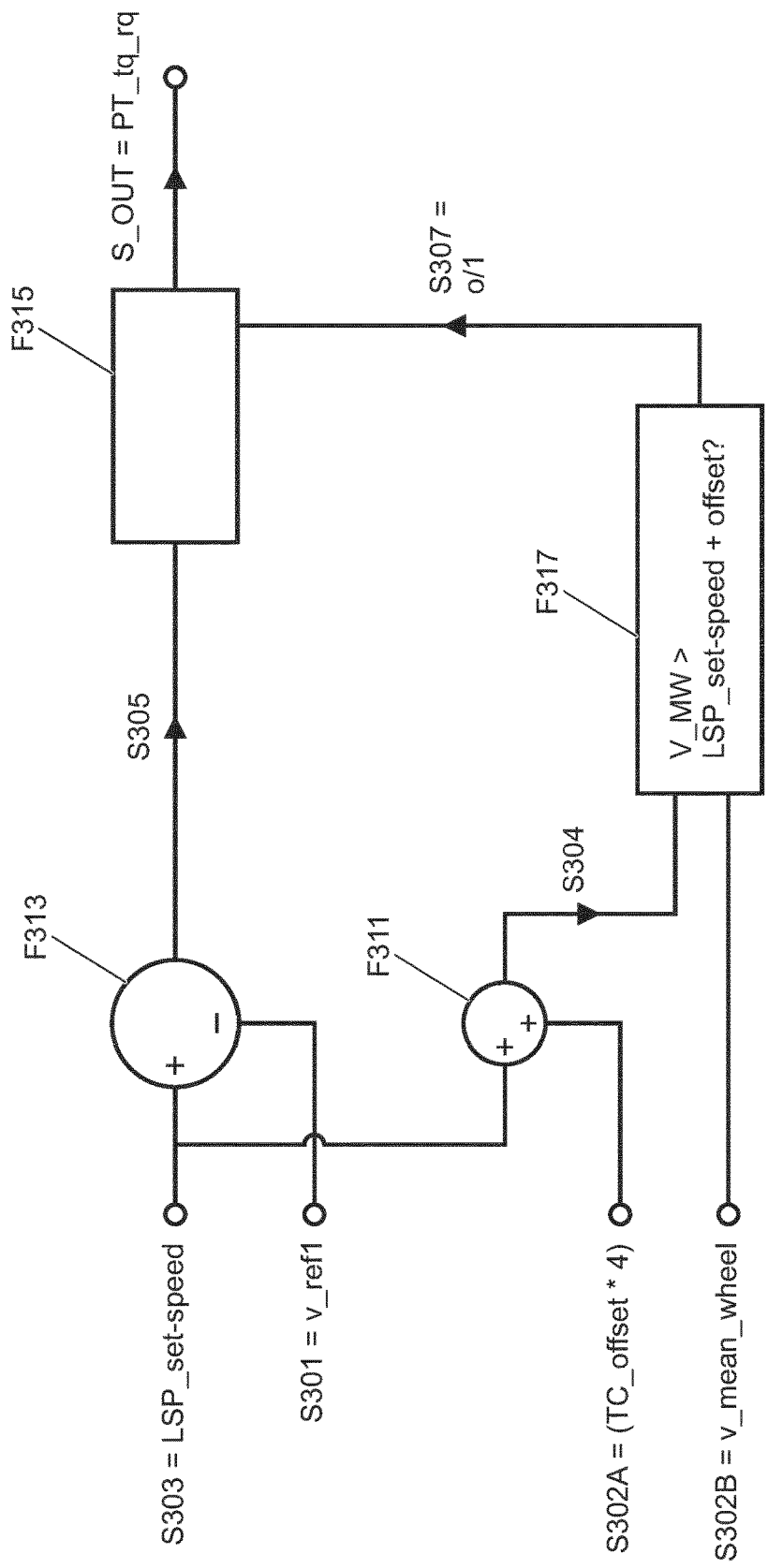
FIG. 8 is a schematic illustration of a portion of a speed control system of a vehicle according to a still further embodiment of the present invention.

FIG. 8 illustrates schematically a portion of the LSP control system 12 of a vehicle according to a further embodiment of the present invention. Like features of the embodiment of FIG. 8 to those of the embodiment of FIG. 7 are shown with like reference signs incremented by 100.

In the embodiment of FIG. 8 a summing function block F311 is provided that is configured to receive input signals S302A=(TC_Offset*4) and S303=LSP_set-speed. Summing function block F311 outputs a signal S304=S302A+S303 to comparison function block F317.

Comparison function block F317 receives input signals S304 and S302B=v_mean_wheel and outputs a signal S307 which is set to '0' or '1' in dependence on the values of S304 and S302B. If S304>S302B, the comparison function block F317 sets S307=1 whilst if S304≤S302B the comparison function block F317 sets S307=0. Signal S307 provides an input to PI control function block F315.

Difference function block F313 receives input signals S301=v_ref1 and S303 and outputs a signal S305 where S305=S303-S301. Signal S305 is input to PI function block F315.

PI function block F315 implements a proportional-integral feedback control methodology in a similar manner to function blocks F115, F215 and F215' described above in order to attempt to control the value of S_OUT (to which PT_tq_rq is set substantially equal) such that the value of signal S305 is substantially equal to zero. However, in the event that signal S307 is set equal to '1' the PI function block F315 is configured to prevent the value of S_OUT, and therefore PT_tq_rq, from increasing. Thus, in the event that v_mean_wheel>(LSP_set-speed+(TC_offset*4)), the PI control function block F315 is prevented from causing the value of S_OUT to increase. Thus, the problem that the value of PT_tq_rq may continue to increase when the vehicle is stationary with three wheels slipping by an excessive amount and one wheel not slipping, may be mitigated.

Figure 9:
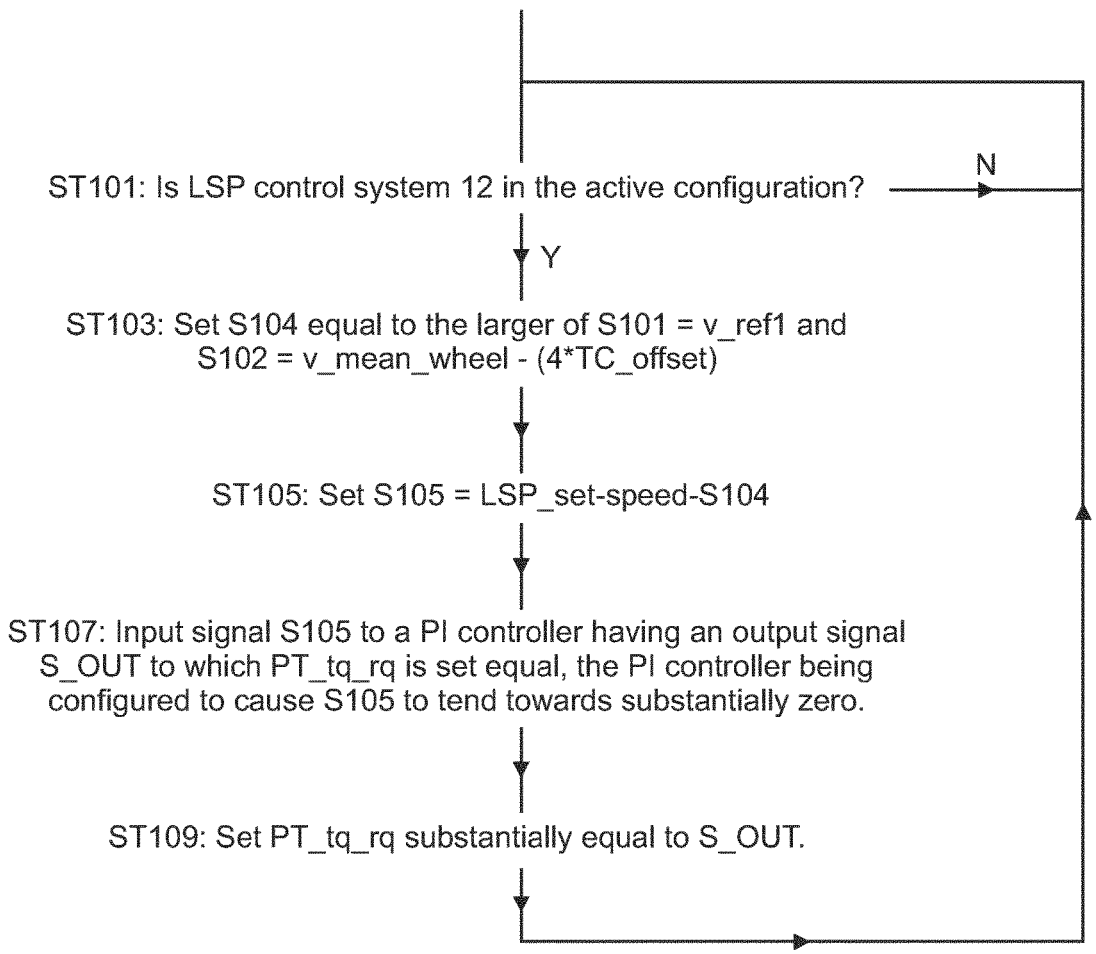
FIG. 9 is a flowchart illustrating operation of a vehicle according to the embodiment of FIG. 6.

Operation of a LSP control system 12 according to the embodiment of FIG. 6 will now be described by reference to the flow diagram of FIG. 9.

At step ST101 the TC function determines whether the LSP control system 12 is in the active configuration. If the TC function determines that the LSP control system 12 is in the active configuration, the method continues at step ST103 else the method continues at step ST109.

At step ST103, the value of a signal S104 is set equal to the larger of a signal S101 that is set equal to a current value of the first vehicle reference speed v_ref1, and a signal 102 which is set equal to v_mean_wheel−(4*TC_offset).

At step ST105, a signal S105 is set equal to the difference between signal S103=LSP_set-speed and signal S104, i.e. S105=LSP_set-speed−S104.

At step ST107 a PI control function block F115 calculates the value of a signal S_OUT according to a PI control methodology in order to cause the value of signal S105 input thereto to tend towards substantially zero.

At step ST109 signal S_OUT is output to a powertrain controller 11 in order to control the amount of torque generated by the powertrain 129. In the present embodiment signal PT_tq_rq is set equal to S_OUT and this signal controls the amount of torque developed by the engine 121.

Embodiments of the present invention have the advantage that when a vehicle is operating with speed controlled by an off-road speed control system, a traction control function or system is able to intervene to reduce excessive wheel slip at lower values of wheel slip than in the case of some other traction control arrangements, at least under certain circumstances. In particular, the problem that the amount of torque generated by a powertrain 129 may increase to a relatively high value when the vehicle is attempting to move from rest over terrain with one wheel substantially stationary and three wheels experiencing substantial slip may be mitigated. This in turn reduces the risk that the vehicle 100 suddenly lurches forward if sufficient traction to cause movement of the vehicle 100 over the surface is abruptly gained. It is to be understood that an abrupt increase in traction can occur for example if a wheel of a vehicle bites through a surface such of relatively low surface coefficient of friction such as a surface comprising snow and/or ice, and contacts a surface of relatively high surface coefficient of friction such as a rock or asphalt surface. Lurch of the vehicle 100 may occur in the event that an abrupt increase in traction occurs, reducing vehicle composure.

Furthermore, some embodiments of the present invention may reduce the amount by which a surface becomes degraded due to wheel slip by reducing the value of wheel slip at which increases in a powertrain torque request signal PT_tq_rq are substantially prevented.

Throughout the description and claims of this specification, the words "comprise" and "contain" and variations of the words, for example "comprising" and "comprises", means "including but not limited to", and is not intended to (and does not) exclude other moieties, additives, components, integers or steps.

Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith.

The invention claimed is:

1. A vehicle control system comprising a speed control system,
    the speed control system being configured automatically to attempt to cause a vehicle to operate in accordance with a target vehicle speed value by causing a first vehicle speed value determined according to a first predetermined method to become or be maintained substantially equal to the predetermined target vehicle speed value at least in part by causing application of positive drive torque to one or more wheels by means of a powertrain,
    wherein the speed control system is configured to impose a constraint on the amount of driving torque that may be demanded of the powertrain in dependence on the target vehicle speed value and a second vehicle speed value determined according to a second predetermined method, said a second predetermined method being based on the mean speed of the driven wheels of the vehicle;
    wherein the speed control system is configured to constrain the amount of driving torque that may be demanded of the powertrain when a predetermined condition is met in respect of the target vehicle speed value and the second vehicle speed value; and
    wherein the predetermined condition includes the condition that the second vehicle speed value exceeds the target vehicle speed value by a predetermined excess vehicle speed.

2. The system according to claim 1 wherein the second vehicle speed value is set substantially equal to the mean speed of the driven wheels of the vehicle.

3. The system according to claim 2 comprising a slip control system configured automatically to cause a reduction in a net torque applied to a wheel when its speed exceeds a predetermined vehicle speed value by a predetermined slip control system intervention threshold value.

4. The system according to claim 3 wherein the predetermined excess speed value is substantially equal to the slip control system intervention threshold value multiplied by the number of driven wheels of the vehicle.

5. The system according to claim 3 wherein the slip control system is configured automatically to cause the reduction in net torque applied to a wheel when its speed exceeds a predetermined one of the first and second vehicle speed values by the predetermined slip control system intervention threshold value.

6. The system according to claim 3 wherein the slip control system is configured to cause the reduction in net torque applied to a wheel at least in part by application of brake torque to the wheel by means of a braking system and/or by causing a reduction in an amount of powertrain torque applied to the wheel.

7. The system according to claim 1 wherein the first vehicle speed value is set substantially equal to a speed of a slowest turning wheel of the vehicle.

8. The system according to claim 1 wherein the speed control system is operable to cause a vehicle to operate in accordance with a target vehicle speed value by controlling an amount of brake torque applied by a braking system and in addition by controlling an amount of drive torque applied by a powertrain to one or more wheels of the vehicle.

9. A motor vehicle comprising a body, four wheels, a powertrain to drive said wheels, a braking system to brake said wheels, operable in at least one of a four wheel drive configuration, in which four of the wheels are driving wheels driven by the powertrain, and a two wheel drive configuration, in which only two of the wheels are driving wheels driven by the powertrain, and a control system according to claim 1.

10. A method controlling a vehicle, comprising:
 automatically attempting, by means of a speed control system, to cause the vehicle to operate in accordance with a target vehicle speed value by causing a first vehicle speed value determined according to a first predetermined method to become or be maintained substantially equal to the predetermined target vehicle speed value at least in part by causing application of positive drive torque to one or more wheels by means of a powertrain,
 the method comprising imposing a constraint on the amount of driving torque that may be demanded of the powertrain in dependence on the target vehicle speed value and a second vehicle speed value determined according to a second predetermined method, said a second predetermined method being based on the mean speed of the driven wheels of the vehicle;
 the method comprising constraining automatically the amount of driving torque that may be demanded of the powertrain when a predetermined condition is met in respect of the target vehicle speed value and the second vehicle speed value, wherein the predetermined condition includes the condition that the second vehicle speed value exceeds the target speed value by a predetermined excess speed value.

11. The method according to claim 10 comprising setting the second vehicle speed value substantially equal to the mean speed of the driven wheels of the vehicle.

12. The method according to claim 11 comprising causing automatically a reduction in a net torque applied to a wheel at least in part by application of brake torque to the wheel by means of a braking system and/or by causing a reduction in an amount of powertrain torque applied to the wheel, when its speed exceeds a predetermined vehicle speed value by a predetermined slip control system intervention threshold value.

13. The method according to claim 12 comprising setting the predetermined excess speed value to a value substantially equal to the slip control system intervention threshold value multiplied by the number of driven wheels of the vehicle, and/or automatically causing the reduction in net torque applied to a wheel when its speed exceeds a predetermined one of the first and second vehicle speed values by the predetermined slip control system intervention threshold value.

14. The method according to claim 10 whereby the first vehicle speed value is set substantially equal to a speed of a slowest turning wheel of the vehicle, and the method comprising causing a vehicle to operate in accordance with a target vehicle speed value by controlling an amount of brake torque applied by a braking system and in addition by controlling an amount of drive torque applied by a powertrain to one or more wheels of the vehicle.

15. A controller comprising at least one processor, the at least one processor being configured to implement the method of claim 10.

16. A non-transitory computer readable medium storing a computer program comprising computer program instructions, that, when performed by one or more processors, implements the method of claim 10.

* * * * *